United States Patent
Ren et al.

(10) Patent No.: US 9,166,745 B2
(45) Date of Patent: Oct. 20, 2015

(54) ALLOCATION OF ACKNOWLEDGEMENT CHANNELS TO CHANNEL GROUPS HAVING VARIABLE TRANSMIT ENERGIES

(75) Inventors: Hong Ren, Kanata (CA); Xixian Chen, Ottawa (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 191 days.

(21) Appl. No.: 13/119,151

(22) PCT Filed: Dec. 31, 2010

(86) PCT No.: PCT/IB2010/056146
§ 371 (c)(1),
(2), (4) Date: Mar. 15, 2011

(87) PCT Pub. No.: WO2012/090028
PCT Pub. Date: Jul. 5, 2012

(65) Prior Publication Data
US 2012/0170524 A1   Jul. 5, 2012

(51) Int. Cl.
*H04W 72/04* (2009.01)
*H04L 1/16* (2006.01)
(Continued)

(52) U.S. Cl.
CPC ............ *H04L 1/1692* (2013.01); *H04L 5/0055* (2013.01); *H04W 52/325* (2013.01); *H04W 52/346* (2013.01); *H04W 72/04* (2013.01); *H04L 1/1812* (2013.01); *H04W 28/04* (2013.01)

(58) Field of Classification Search
CPC ... H04W 52/48; H04W 52/325; H04W 52/16; H04L 1/1887; H04L 5/0007
USPC ................ 370/329, 342, 335; 455/522, 452.1
See application file for complete search history.

(56) References Cited

U.S. PATENT DOCUMENTS

| 6,393,005 B1 * | 5/2002 | Mimura ......................... 370/335 |
| 2002/0027959 A1 * | 3/2002 | Haim ............................ 375/297 |

(Continued)

FOREIGN PATENT DOCUMENTS

| WO | 2006/031177 A1 | 3/2006 |
| WO | 2008/133454 A1 | 11/2008 |

(Continued)

OTHER PUBLICATIONS

3rd Generation Partnership Project. "Framework for the PHICH Demodulation Requirements." TSG RAN WG4 meeting # 46bis, R4-080600, Shenzhen, China, Mar. 31-Apr. 4, 2008.

(Continued)

*Primary Examiner* — Jamal Javaid
(74) *Attorney, Agent, or Firm* — Coats & Bennett, PLLC

(57) ABSTRACT

A method and apparatus is provided for assigning resources for an acknowledgement channel, such as the PHICH in LTE systems. Acknowledgement channels for the mobile terminals are assigned to channel groups based on a predetermined assignment criteria. All acknowledgment channels in the same channel group receive acknowledgements on the same downlink resources (e.g., resource elements in OFDM system). A required transmit energy for each channel is determined. If the total required transmit energy for all channels exceeds an available transmit power, the allocated transmit energy for each channel is either scaled down so that the total actual transmit power for all acknowledgment channels is equal to the available transmit power, or some acknowledgment channels are not transmitted.

36 Claims, 5 Drawing Sheets

(51) Int. Cl.
*H04L 5/00* (2006.01)
*H04W 52/32* (2009.01)
*H04W 52/34* (2009.01)
*H04L 1/18* (2006.01)
*H04W 28/04* (2009.01)

(56) References Cited

U.S. PATENT DOCUMENTS

| | | |
|---|---|---|
| 2004/0120636 A1 * | 6/2004 | Walter et al. .................... 385/18 |
| 2004/0198405 A1 * | 10/2004 | Marinier ...................... 455/522 |
| 2007/0206660 A1 * | 9/2007 | Lifchuk ........................ 375/132 |
| 2007/0242652 A1 | 10/2007 | Dahlman |
| 2009/0129497 A1 * | 5/2009 | Stopler et al. ................. 375/267 |
| 2010/0061359 A1 * | 3/2010 | Fukuoka et al. ............. 370/342 |
| 2010/0067464 A1 | 3/2010 | Higuchi |
| 2010/0103899 A1 * | 4/2010 | Kwak et al. ................... 370/329 |
| 2011/0249644 A1 * | 10/2011 | Boariu et al. ................. 370/329 |
| 2011/0263286 A1 | 10/2011 | Damnjanovic |
| 2012/0008556 A1 | 1/2012 | Noh et al. |
| 2012/0026985 A1 | 2/2012 | Ren et al. |
| 2012/0243497 A1 | 9/2012 | Chung |
| 2012/0307755 A1 | 12/2012 | Kim et al. |
| 2013/0021898 A1 | 1/2013 | Kang et al. |
| 2013/0044722 A1 | 2/2013 | Kang et al. |
| 2013/0279447 A1 | 10/2013 | Noh et al. |
| 2013/0286918 A1 | 10/2013 | Park et al. |

FOREIGN PATENT DOCUMENTS

| | | |
|---|---|---|
| WO | WO 2010137341 A1 * | 12/2010 |
| WO | 2011/000673 A2 | 1/2011 |

OTHER PUBLICATIONS

Love, R. et al. "Downlink Control Channel Design for 3GPP LTE." IEEE Wireless Communications and Networking Conference, 2008 (WCNC 208), Las Vegas, NV, US, Mar. 31-Apr. 2, 2008.

3rd Generation Partnership Project. "Updated E-UTRAN TDD Test Models." 3GPP TSG-RAN WG4 #48bis, R4-082610, Edinburgh, UK, Sep. 29-Oct. 22, 2008.

* cited by examiner

ALLOCATION OF ACKNOWLEDGEMENT CHANNELS TO CHANNEL GROUPS HAVING VARIABLE TRANSMIT ENERGIES

BACKGROUND

The present invention relates generally to acknowledgement of uplink transmissions in a mobile communication system and, more particularly, to resource allocation for acknowledgment channels.

A Hybrid Automatic Repeat Request (HARQ) protocol is used for uplink transmission in Long Term Evolution (LTE) systems. When a mobile terminal transmits data on the assigned uplink resources, the base station sends an acknowledgement signal to the mobile terminal to indicate whether the uplink transmission was successful. The acknowledgement signal comprises a single bit that is set to 0 for a positive acknowledgement (ACK) or to 1 for a negative acknowledgement (NACK). The acknowledgement signal is transmitted on a dedicated control channel called the Physical HARQ Indicator Channel (PHICH). Each mobile terminal is assigned to a respective PHICH.

In LTE, the PHICHs for multiple mobile terminals are divided into PHICH groups. In FDD (Frequency Division Duplex) mode, the number of PHICH groups is constant in all subframes and is determined by system bandwidth and a higher layer configuration parameter. In TDD (Time Division Duplex) mode, the number of PHICH groups may vary between subframes. Each PHICH group can have up to eight channels, which all share the same resource elements. The PHICHs within a group are assigned different orthogonal spreading sequences to separate the channels within a PHICH group using code division multiplexing (CDM). A PHICH resource is identified by an index pair ($n_{group}$, $m_{seq}$), where $n_{group}$ is the PHICH group number and $m_{seq}$ is the index of the orthogonal sequence within the group.

For proper operation of the HARQ protocol, the error rate of the PHICH should be sufficiently low. Typically, the target error rate should be in the order of $10^{-2}$ for ACKs and $10^{-3}$ to $10^{-4}$ for NACKs. Because the mobile terminals do not all experience the same channel conditions, the assignment of PHICHs/mobile terminals to PHICH groups should be done in a manner to ensures that the transmit energy allocated to the PHICH for each mobile terminal is sufficient for the reliable detection of the acknowledgement signal by the mobile terminal.

SUMMARY

The present invention provides a method and apparatus for assigning resources for an acknowledgement channel, such as the PHICH in LTE systems. In one embodiment, the acknowledgement channels for the mobile terminals are assigned to channel groups based on a predetermined assignment criteria. All acknowledgment channels in the same channel group receive acknowledgements on the same downlink resources (e.g., resource elements in OFDM system). The required transmit energy per resource element (TEPRE) for each acknowledgement channel is determined. If the total required TEPRE for all acknowledgement channels exceeds the available transmit power for the PHICH, the allocated TEPRE for each acknowledgement channel is determined by normalizing the total required TEPRE for each acknowledgement channel against the available transmit power for the PHICH.

One exemplary embodiment of the invention comprises a method implemented by a base station of assigning resources on a downlink control channel to a group of acknowledgement channels for sending acknowledgement signals to a group of scheduled mobile terminals transmitting on an uplink traffic channel. In one exemplary method, a required transmit energy for an acknowledgement channel is determined based on the downlink channel conditions experienced by corresponding mobile terminals assigned to the acknowledgement channels. Each acknowledgement channel is assigned to a channel group, wherein acknowledgement channels in the same channel groups share the same downlink resources. The transmit energy for each channel is either scaled down so that the total actual transmit power for all acknowledgment channels is equal to the available transmit power, or some acknowledgment channels are not transmitted when the total required transmit energy for all acknowledgement channels in all channel groups exceeds an available transmit power for all acknowledgement.

Other embodiments of the invention comprise a base station to implement the above method. One exemplary base station comprises a transceiver for communicating with a group of mobile terminals and a control unit connected to the transceiver. The control unit comprises a retransmission controller to send acknowledgment signals to the mobile terminals over respective acknowledgement channels to acknowledge uplink transmissions from the mobile terminals, and a scheduler to schedule the uplink transmission from the mobile terminals. The scheduler assigns resources on a downlink control channel to the acknowledgment channels. The scheduler determines, for each acknowledgment channel, a required transmit energy based on the channel conditions experienced by the mobile terminal and assigns each acknowledgment channel to a channel group. Acknowledgement channels in the same channel groups share the same downlink resources. The scheduler is further configured to normalize the required transmit energy for all channels to a predetermined value when the total required transmit energy for all acknowledgment channels in all channel groups exceeds an available transmit power for PHICH.

The embodiments of the invention minimize the impact on error rate performance by removing the assumption that the transmit energy per resource element is the same for all channel groups. The mobile terminals can then be assigned to channel groups based on any applicable assignment criteria. It is not necessary to maintain the transmit energies equal across different groups. If there is insufficient transmit energy available for all groups, then the required transmit energy for each channel can be normalized to the available transmit power. This process allows transmit energy sharing among all PHICH groups so the groups requiring less energy can give the energy headroom to groups that require higher transmit energy and thus reduces errors in transmission of acknowledgement signals.

DETAILED DESCRIPTION

Figure 1:
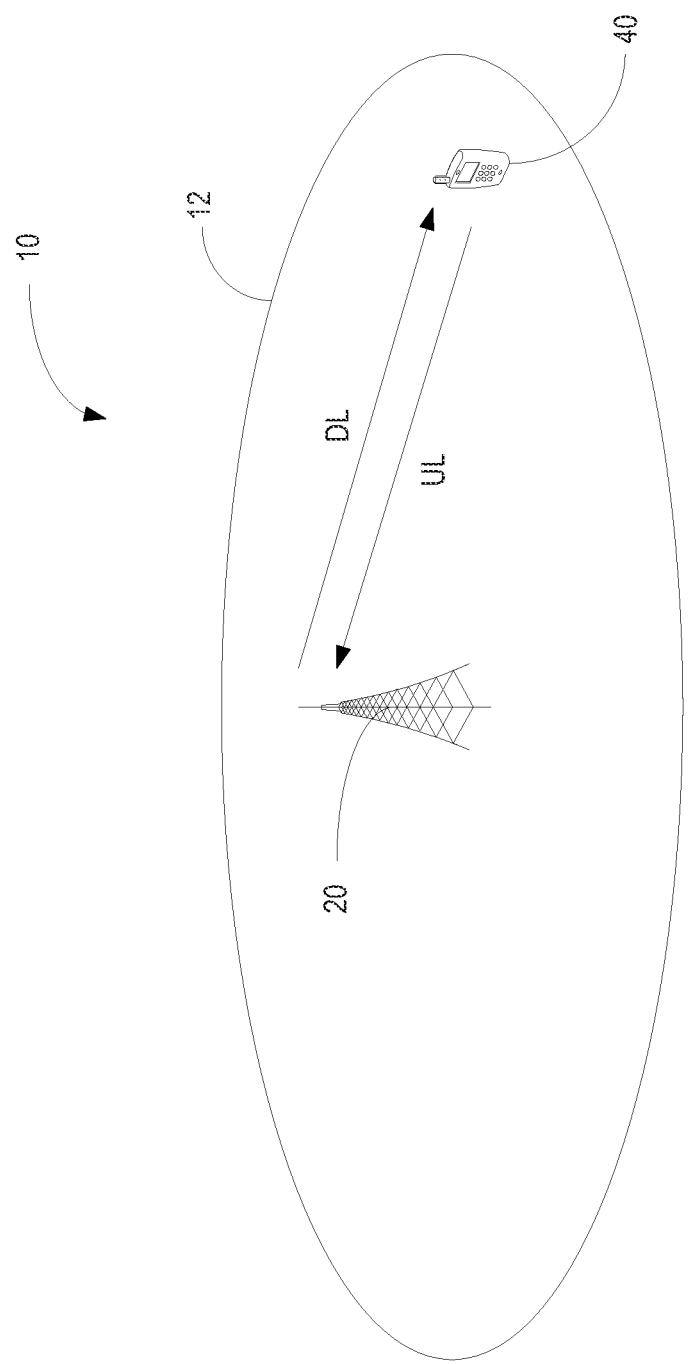
FIG. 1 illustrates a mobile communication system.

Referring now to the drawings, FIG. 1 illustrates a mobile terminal 40 in a mobile communication network 10. The mobile terminal 40 may comprise, for example, a cellular telephone, personal digital assistant, smart phone, laptop computer, handheld computer, or other device with wireless communication capabilities. Mobile terminal 40 communicates with a base station 20 in a serving cell or sector 12 of the mobile communication network 10. The mobile terminal 40 receives signals on one or more downlink (DL) channels and transmits signals to the base station 20 on one or more uplink (UL) channels.

For illustrative purposes, an exemplary embodiment of the present invention will be described in the context of a Long-Term Evolution (LTE) system. Those skilled in the art will appreciate, however, that the present invention is more generally applicable to other wireless communication systems, including Wideband Code-Division Multiple Access (WCDMA) systems and WiMax (IEEE 802.16) systems. In LTE, the mobile terminal 40 is referred to as user equipment (UE) and the base station 20 is referred to as a NodeB or Enhanced NodeB (eNodeB). The generic terms mobile terminal 40 and base station 20 are used herein except where otherwise noted.

Figure 2:
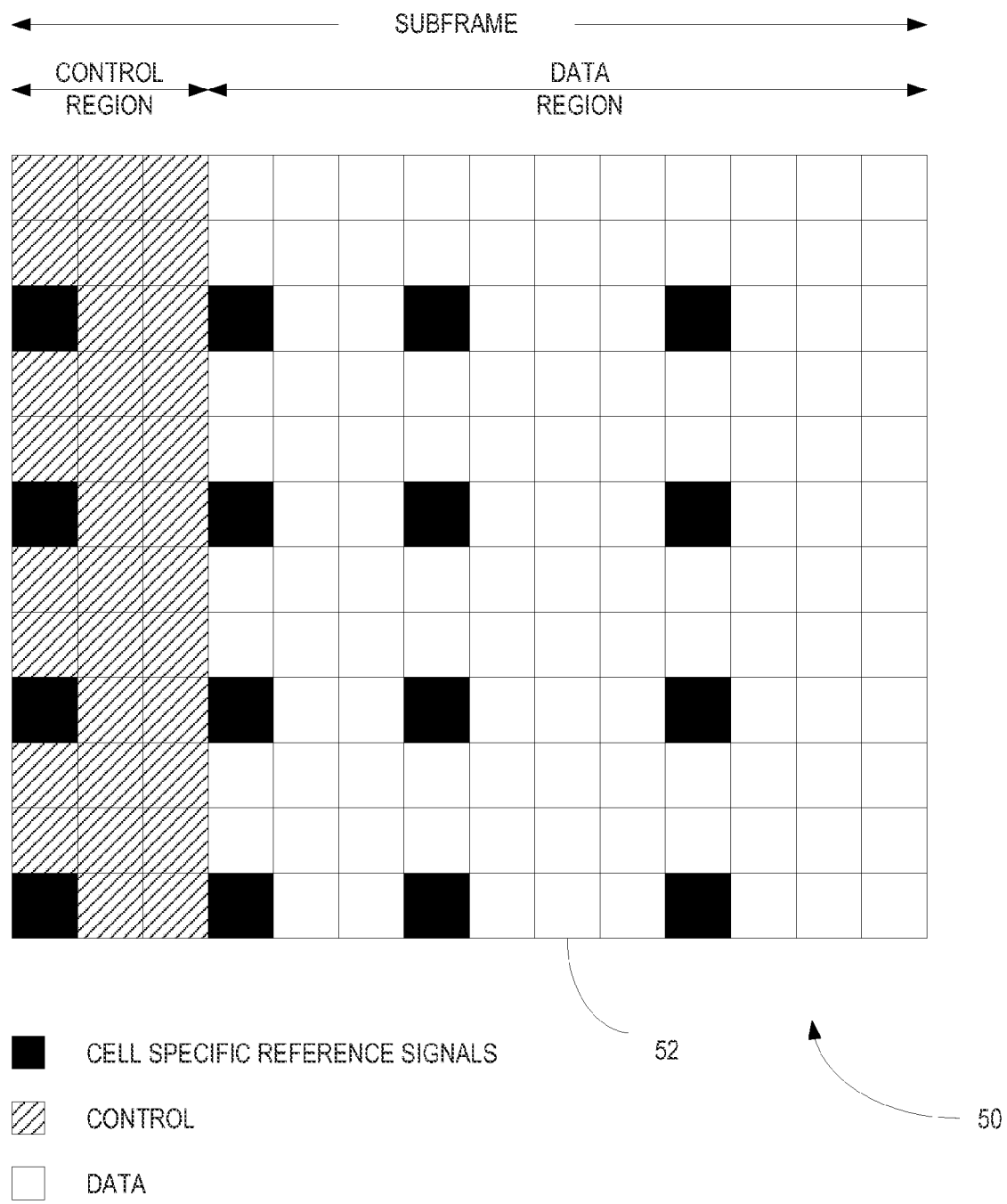
FIG. 2 illustrates a time-frequency grid for an exemplary communication system based on the Long Term Evolution (LTE) standard.

LTE uses Orthogonal Frequency Division Multiplexing (OFDM) in the downlink and Single-Carrier OFDM (SC-OFDM) in the uplink. The available radio resources in LTE systems can be viewed as a time-frequency grid. FIG. 2 illustrates a portion of an exemplary OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe comprises fourteen OFDM symbols. A subframe comprises twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 50 is a resource element (RE) 52. A resource element 52 comprises one OFDM subcarrier during one OFDM symbol interval.

Figure 3:
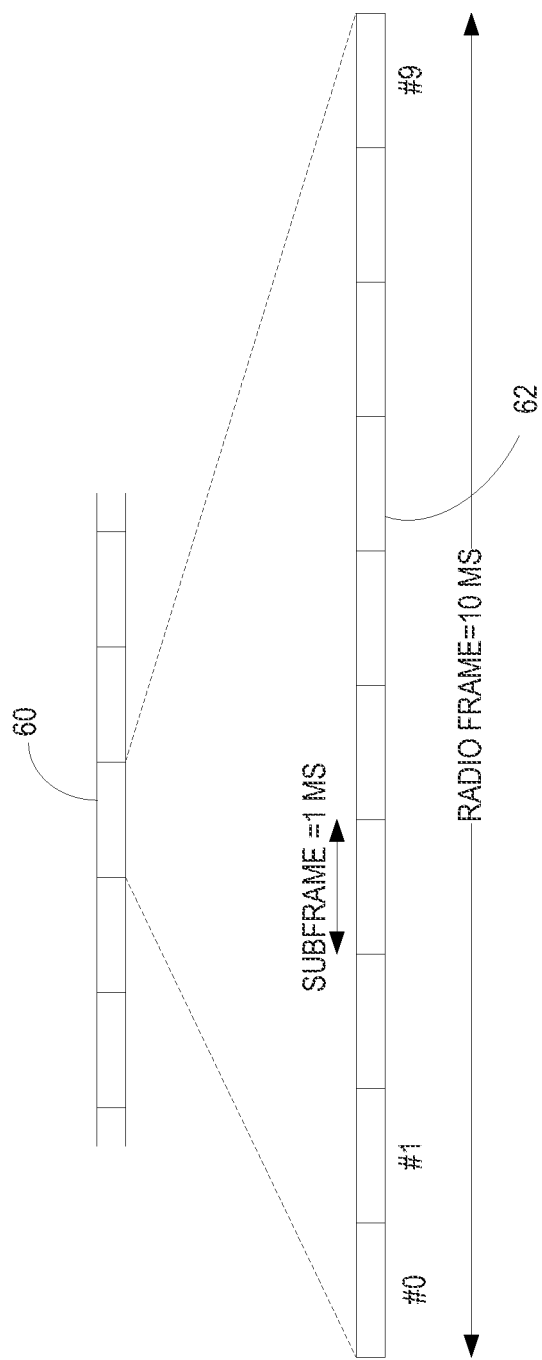
FIG. 3 illustrates an exemplary radio frame in a LTE system.

In LTE systems, data is transmitted from the mobile terminals 40, to the base 20 station on the Physical Uplink Shared Channel (PUSCH). The PUSCH is a time and frequency multiplexed channel shared by a plurality of mobile terminals 40. As shown in FIG. 3, the uplink transmissions are organized into 10 ms radio frames 60. Each radio frame comprises ten equally-sized subframes 62. For purposes of scheduling uplink transmissions, the time-frequency resources are allocated in units called resource blocks (RBs). Each resource block spans twelve adjacent subcarriers in the frequency domain, and one 0.5 ms slot (one half of one subframe). The term "resource block pair" refers to two consecutive resource blocks occupying an entire one millisecond subframe.

When a mobile terminal 40 has data to send on the uplink, the mobile terminal 40 sends a scheduling request to the serving base station 20. The scheduling request is sent on the Physical Uplink Control Channel (PUCCH). A scheduler at the base station 20 coordinates transmissions by the mobile terminals on the PUSCH and allocates uplink resources (e.g. resource blocks) to the mobile terminals 40 for uplink transmission on the PUSCH. The base station 20 then sends a scheduling grant to the mobile terminal 40 on the Physical Downlink Control Channel (PDCCH). The scheduling grant includes the resource block allocation for the uplink transmission as well as the modulation and coding scheme to be used for the uplink transmission. The mobile terminal 40 may then transmit data on the assigned uplink resources.

A Hybrid Automatic Repeat Request (HARQ) protocol is used for uplink transmission. When the mobile terminal 40 transmits data on the assigned uplink resources, the base station 20 sends an acknowledgement signal to the mobile terminal 40 to indicate whether the uplink transmission was successful. The acknowledgement signal comprises a single bit that is set to 0 for a positive acknowledgement (ACK) or to 1 for a negative acknowledgement (NACK). The acknowledgement signal is transmitted on a dedicated control channel called the Physical HARQ Indicator Channel (PHICH), which is also referred to herein generically as an acknowledgement channel: Each mobile terminal 40 is assigned to a respective PHICH. To increase robustness, each HARQ acknowledgement (one single bit of information) is repeated three times.

In LTE, the PHICHs for multiple mobile terminals 40 are divided into PHICH groups, which are also referred to herein as channel groups. In FDD (Frequency Division Duplex) mode, the number of PHICH groups is constant in all subframes and is determined by system bandwidth and a higher layer configuration parameter. In TDD (Time Division Duplex) mode, the number of PHICH groups may vary between subframes. Each PHICH group can have up to eight channels, which all share the same resource elements. The PHICHs within a group are assigned different orthogonal spreading sequences to separate the channels within a PHICH group using code division multiplexing (CDM). Thus, the total energy within a group is shared by all of the PHICHs within the PHICH group.

In LTE, a PHICH resource is identified by an index pair, ($n_{group}$, $m_{seq}$), where $n_{group}$ is the PHICH group number and $m_{seq}$ is the orthogonal sequence within the group. The computation of the indices $n_{group}$ and $m_{seq}$ is specified by the LTE standard. More particularly, the group index $n_{group}$ is given by:

$$n_{group} = (I_{PRB}^{Index} + n_{DMRS}) \bmod N_{group} + \alpha N_{group} \qquad \text{Eq. 1}$$

and the sequence index is given by:

$$m_{seq} = (\lfloor I_{PRB}^{Index}/N_{group} \rfloor + n_{DMRS}) \bmod 2N_{SF} \qquad \text{Eq. 2}$$

where $I_{PRB}^{Index}$ is the resource block (RB) index of the lowest Physical Resource Block (PRB) in the first slot of the corresponding PUSCH transmission, $n_{DMRS}$ is mapped from the cyclic shift of the Demodulation Reference Signal (DMRS) field in the most recent DCI (Downlink Control Information) format 0 (UL scheduling grant) for the mobile terminal 40. For a semi-persistently configured PUSCH initial transmission or a PUSCH transmission associated with a random access response grant, $n_{DMRS}$ is set to zero. $N_{SF}$ is the spreading factor for the PHICH, and $\alpha$ is a configuration parameter. The resource block index $I_{PRB}^{Index}$ is sent by the base station 20 in the scheduling grant to indicate the uplink resources allocated to the mobile terminal 40 for the uplink transmission. The spreading factor $N_{SF}$ is 4 for a normal cyclic prefix and 2 for the extended cyclic prefix.

For a PUSCH transmission, $I_{PRB}^{Index}$ is determined by a scheduler 32 at the base station 20 based on many factors, including the type and amount of the buffered data at the mobile terminal 40, and the channel conditions experienced by the mobile terminal 40. On the other hand, $n_{DMRS}$ can be chosen from up to 8 possible integers, from 0 to 7. Once $I_{PRB}^{Index}$ is determined, the resource allocation for a given PHICH reduces to the selection of $n_{DMRS}$.

For proper operation of the HARQ protocol, the error rate of the PHICH should be sufficiently low. Typically, the target error rate should be in the order of $10^{-2}$ for ACKs and $10^{-3}$ to $10^{-4}$ for NACKs. Because the mobile terminals 40 do not all experience the same channel conditions, the assignment of PHICHs/mobile terminals 40 to PHICH groups should be done in a manner to ensures that the transmit energy allocated to the PHICH for each mobile terminal 40 is sufficient for the reliable detection of the acknowledgement signal by the mobile terminal 40. For example, mobile terminals 40 close to a cell edge are likely to experience poor channel conditions while mobile terminals 40 near the base station 20 are likely to have good channel conditions. Consequently, higher transmit energy should be allocated to the PHICH for mobile terminals 40 near the cell edge to ensure that the PHICH is reliably received. Conversely, mobile terminal 40 with good channel conditions can reliably receive the PHICH at lower transmit energy levels. Additionally, the allocation of resources and transmit energy should spread the PHICH channels over the PHICH groups to maximize resource utilization as much as possible.

With the assumptions that the transmit energy per resource element (TEPRE) is the same for all PHICH groups and is fixed, the TEPRE allocated to a specific PHICH/mobile terminal 40 is affected by number of PHICHs/mobile terminals 40 assigned to the same PHICH group and the channel conditions of the other mobile terminals 40 in the PHICH group. A PHICH for a mobile terminal 40 with very poor channel conditions should be the only PHICH/mobile terminal 40 in a given PHICH group to ensure sufficient energy for reliable PHICH detection.

When a large number of mobile terminals 40 are scheduled to transmit on the PUSCH, reducing group size to enable reliable detection of the PHICH for some mobile terminals 40 implies the need for a larger number of groups. Each PHICH group uses the same number of resource elements, so increasing the number of PHICH groups means that more resource elements will be used by the PHICH groups and fewer resource elements will be available for the PDCCH. In practice, the number of PHICH groups reflects a trade-off between PHICH resources and PDCCH resources. Thus, while it may be desirable to assign PHICHs/mobile terminals 40 with poor channel conditions to a PHICH group by itself, there may not be sufficient PHICH resources for a large number of PHICH groups. Thus, it is likely that some PHICHs for mobile terminals 40 with poor channel conditions will be assigned to PHICH groups with other PHICHs/mobile terminals 40 and thus have to share the transmit energy allocated to the group with other PHICHs/mobile terminals 40.

If the transmit EPRE is assumed to be the same for all groups, in order to minimize the impact on error rate performance, the PHICHs/mobile terminals 40 should be distributed across PHICH groups in a manner that keeps the required transmit energy for all PHICH groups as equal as possible. A simple method is to assign the PHICHs one at a time to a PHICH group with the lowest cumulative TEPRE. This method tries to minimize the impact on error rate performance by distributing the mobile terminals 40 across groups in a manner that keeps the required transmit energy for all PHICH groups as equal as possible. The variance in the required transmit energy for different PHICH groups can be reduced by sorting the PHICH channels for the mobile terminals 40 in descending order of TEPRE. This solution does not guarantee that the required transmit energy is equal for all PHICH groups and energy cannot be shared between groups. Thus, when the required TEPRE for one PHICH group is less than the fixed TEPRE per group, the energy not required cannot be shared with other PHICH groups requiring more energy. In this case, the actual TEPRE for each PHICH in the PHICH group is scaled up so that the actual TEPRE for the PHICH group is equal to the fixed TEPRE. On the other hand, when the required TEPRE for one PHICH group is greater than the fixed TEPRE per group, the actual TEPRE for each PHICH is scaled down to ensure the actual TEPRE for the group doesn't exceed the fixed TEPRE. This solution requires that the PHICH channels be sorted according to required TEPRE for the PHICH. Also, the scaling (either up or down) is needed for almost all PHICH groups because it is rarely that the required TEPRE for a PHICH group is the same as the fixed TEPRE. These steps add to the computational complexity of the assignment process.

One exemplary embodiment of the invention described below removes the assumption that the TEPRE for each PHICH group is the same. The required TEPRE for each PHICH is determined based on the mobile terminal's downlink channel conditions and error performance requirements. As the PHICHs/mobile terminals 40 are assigned to PHICH groups, the cumulative TEPRE for each PHICH group is computed as the sum of the required TEPRE for all PHICHs in the group. If the sum of the cumulative TEPRE for all PHICH groups (or equivalently the sum of the TEPRE for all PHICHs assigned to such groups) is greater than the transmit power allocated to the PHICH, the TEPRE for all PHICHs is normalized against the transmit power allocated for the PHICHs. Otherwise, the actual transmit TEPRE for a given PHICH is set equal to the required TEPRE for the PHICH. In some embodiments, a counter can be implemented to record the number of normalizations during a given period of time and the value of the counter can be used to determine whether the number of PHICH groups should be adjusted.

When assigning a PHICH channel to a PHICH group, different criterion may be used. For example, mobile terminals 40 may be assigned to the PHICH group with the least number of PHICH channels, or to the PHICH group with the smallest required transmit energy. Hybrid approaches can also be used where both the number of PHICH channels and required transmit energies are considered. This approach is also compatible with multiuser MIMO on the PUSCH.

Figure 4:
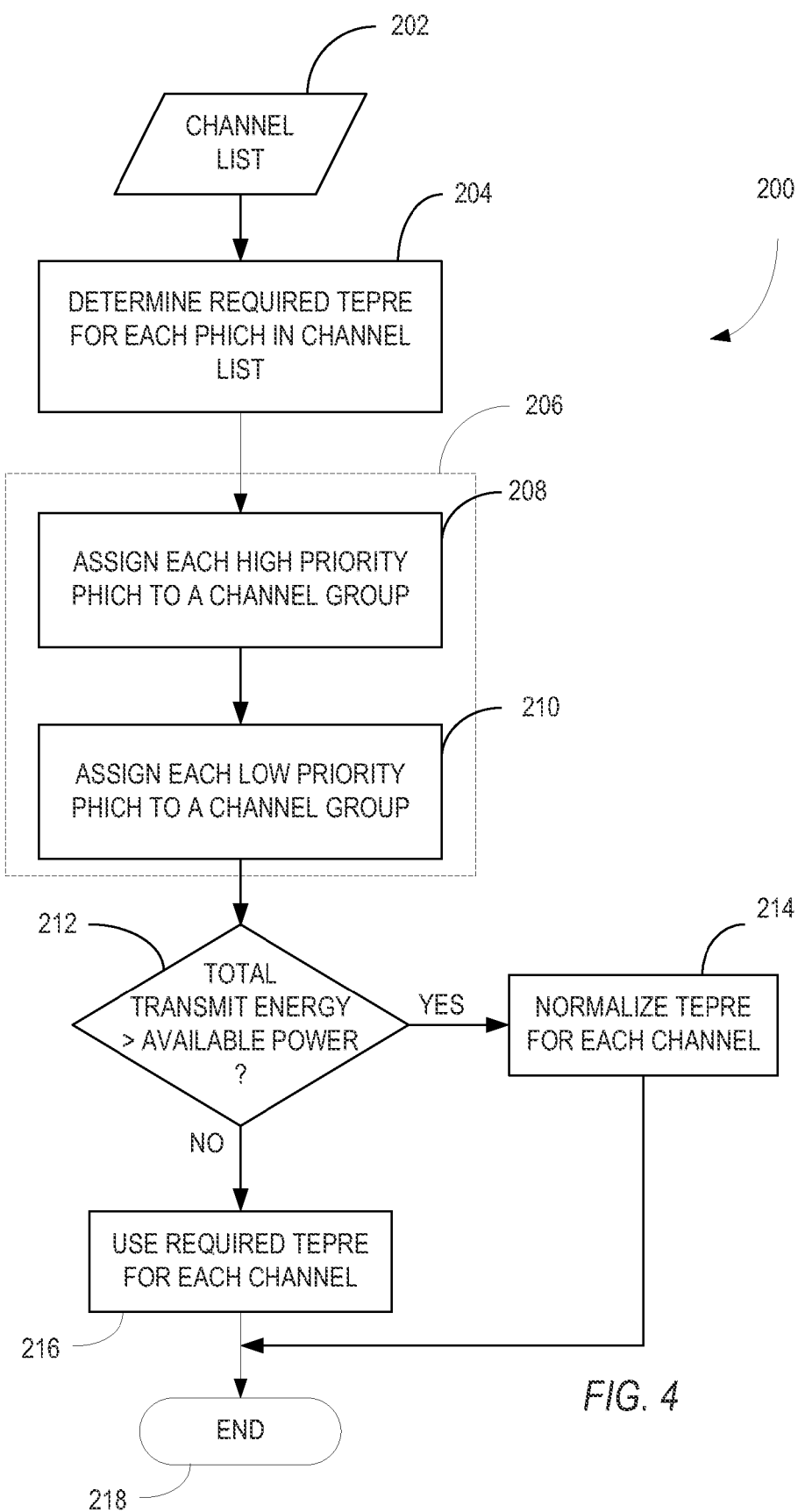
FIG. 4 illustrates an exemplary resource allocation method according to one exemplary embodiment.

FIG. 4 illustrates an exemplary method 200 of assigning PHICH resources and transmit energy according to one exemplary embodiment. The scheduler 32 at the base station 20 schedules uplink transmissions from the mobile terminals 40 during a scheduling interval. When the mobile terminals 40 are scheduled on the PUSCH, PHICH resources need to be assigned to the mobile terminals 40 for acknowledgement of the uplink transmissions. The assignment of PHICH resources begins with a list of the scheduled mobile terminals 40 (block 202). The scheduler 32 determines the required TEPRE for all scheduled mobile terminals 40 (block 204). The required TEPRE is determined based on the channel conditions and error performance requirements for the mobile terminals 40. The required TEPRE is the actual TEPRE needed to ensure a desired error performance criterion. The scheduler 32 then assigns the PHICHs/mobile terminals 40 to PHICH groups (block 206).

During the assignment process, PHICH resources are first allocated to high priority PHICHs for mobile terminals 40 that do not require a Downlink Control Information (DCI) format 0 uplink grant (block 208). This group of channels, referred to herein as the high priority group, includes PHICHs for: 1) semi-persistently scheduled PUSCH transmissions; 2) PUSCH transmissions associated with random access response grants; and 3) PUSCH HARQ retransmissions that does not require DCI format 0 grant (for which $n_{DMRS}$ remains the same as the initial transmission). For these high priority PHICH channels, $n_{DMRS}$ is fixed and can't be arbitrarily changed. The PHICH group and orthogonal spreading sequence are identified based on the given $n_{DMRS}$ and marked as unavailable. The cumulative TEPREs for the corresponding PHICH groups are then computed. PHICH resources are then assigned to the remaining PHICHs/mobile terminals 40, referred to herein as the low priority group (block 210). In this case, there is more flexibility in assigning PHICH resources because the cyclic shift of the DMRS is not already determined. As noted previously, once the lowest resource block for an uplink transmission is determined, the assignment of PHICH resources reduces to the selection of the cyclic shift for the DMRS. As described in more detail below, PHICHs in this group may be assigned one at a time in any order to a PHICH group based on certain criterion. However, in some scenarios, the PHICHs may be sorted and assigned in descending order based on their required TEPRE.

To compute the TEPRE, downlink wideband CQI (Channel Quality Indicator) can be used to represent downlink channel condition. To be more specific, the wideband CQI reported by a mobile terminal can be filtered and then mapped to a signal quality metric, such as a Signal-to-Interference and Noise Ratio (SINR), or channel gain metric, such as a Channel Gain-to-Interference and Noise Ratio (GINR) for the DL Reference Signal (RS). The RS SINR can be adjusted based on PDCCH transmission success or failure to represent PDCCH SINR. One approach to determine the required TEPRE for a PHICH channel is to estimate PHICH SINR as PDCCH SINR, or other control channel signal quality metric, plus an offset. The offset can be obtained from simulation results. The target PHICH SINR that guarantees an acceptable error rate can be obtained from simulations and field test results while the estimated PHICH SINR is obtained with the assumption that the PHICH TEPRE is the same as the RS TEPRE. The required TEPRE for the PHICH in dBm ($TEPRE_{Req}^{PHICH}$) equals the RS TEPRE in dBm ($TEPRE^{RS}$) plus target PHICH SINR in dB ($SINR_{Target}^{PHICH}$), and minus estimated PHICH SINR in dB ($SINR_{Est}^{PHICH}$). The required TEPRE is thus given by:

$$TEPRE_{Req}^{PHICH} = TEPRE^{RS} + SINR_{Target}^{PHICH} - SINR_{Est}^{PHICH} \quad \text{Eq. 3}$$

Another approach assumes that the required PHICH TEPRE equals a fixed TEPRE minus the RS GINR or other channel gain metric. The fixed TEPRE can be determined based on simulation and field test results. A third approach determines the TEPRE for the PHICH based on a control channel transmit energy, such as the PDCCH TEPRE. More particularly, this approach assumes the required PHICH TERPE equals the PDCCH TEPRE plus an offset which is the function of the PDCCH coding rate, the number of Control Channel Elements (CCE) for the PDCCH, or both. The offset can be determined based on simulation and field test results. Because different mobile terminals 40 will have different channel conditions, the required TEPRE will be different for different mobile terminals 40.

Different criterion may be used to assign mobile terminals 40 to PHICH groups. A few examples of possible assignment criterion are:

1. Assign the PHICH/mobile terminal 40 to the first available group determined by the group index.
2. Assign the PHICH/mobile terminal 40 to the available PHICH group with the minimum number of mobile terminals 40 previously assigned.
3. Assign the PHICH/mobile terminal 40 to the group with the minimum cumulative TEPRE.
4. Assign the PHICH/mobile terminal 40 to an available group that has the lowest cumulative TEPRE without exceeding a maximum limit on the number of mobile terminals 40 per group.

Other assignment criteria are also possible.

Once all the PHICHs/mobile terminals 40 have been assigned PHICH resources, the scheduler 32 determines whether the total required transmit power for all mobile terminals 40 exceeds the maximum available transmit power for the PHICH (block 212). The total required transmit energy for all mobile terminals 40 may be computed by summing the cumulative TEPRE for each PHICH group or, equivalently, summing the required TEPRE for all mobile terminals 40. If the total-required transmit power exceeds the maximum available transmit power, the scheduler 32 normalizes the required TEPRE for each PHICH to obtain the actual TEPRE (block 214). Otherwise, the actual TEPRE for each PHICH is the required TEPRE for the PHICH (block 216) and the process ends (block 218). An advantage of this approach is that each PHICH group will receive the required energy unless the total required transmit power for all mobile terminals 40 exceeds the total available transmit power. This approach should, therefore, reduce the error rate on the PHICH. This approach also improves the efficiency of the system by sharing the transmit power for PHICH among different PHICH groups with different required cumulative TEPREs.

Exemplary pseudo-code for assigning PHICH resources according to the embodiment shown in FIG. 4 is listed below.

Code List 1 - Pseudo Code for PHICH Assignment

Input: a list of the scheduled mobile terminals (UEs), and the lowest PRB index of the RBs assigned in the first slot to each mobile terminal.
Define
$E_{sum}(n)$: required transmit energy per resource element per group for PHICH group n
N(n): number of PHICH channels in PHICH group n.
$E_i$: the required transmit energy per RE for PHICH channel i (or for UE i).
Initialize $E_{sum}(n)$ and N(n) to zero for all PHICH groups in the subframe.
For all UEs in the list whose corresponding PUSCH transmissions (including HARQ retransmissions) do not need a DCI format 0 UL grant
    Get the lowest PRB index, $I_{PRB}^{Index}$ for the UE (UE i)
    Determine $n_{DMRS}$ based on the latest UL grant (or it is zero for a
      semi-persistently configured PUSCH transmission or a PUSCH
      transmission associated with a random access response grant)
    Calculate the corresponding resource (n , m) from $n_{DMRS}$ and $I_{PRB}^{Index}$.
    Mark the resource (n , m) as unavailable
    Mark UE i as processed
    $E_{sum}(n) = E_{sum}(n') + E_i$
    N(n) = N(n) + 1
End
Take the next unprocessed UE in the list
While the end of the list is not reached
    Get the lowest PRB index, $I_{PRB}^{Index}$ for the UE (UE i)
    For $n_{DMRS}$ = 0 to 7
      Calculate the corresponding resource ($n_{group}$, $m_{seq}$)
      If the resource ($n_{group}$, $m_{seq}$) is valid and available $n_{group}$ is valid
      End
    End
    In case of criterion 1
      $n^0$ is the first valid $n_{group}$
    End
    In case of criterion 2
      If there is only one group with min N(n) for all valid $n_{group}$
        $N(n^0)$ = min N(n)  n∈all valid $n_{group}$
      Else
        $N(n^1)$ = min N(n)  n∈ all valid $n_{group}$
        $E_{sum}(n^0)$ = min $E_{sum}(n)$  n∈$n^1$
      End
    End
    In case of criterion 3

-continued

Code List 1 - Pseudo Code for PHICH Assignment

```
    If there is only one group with min E_sum(n) for all valid n_group
        E_sum(n⁰) = min E_sum(n)    n∈all valid n_group
    Else
        E_sum(n¹) = min E_sum(n)    n∈ all valid n_group
        N(n⁰) = min N(n)    n∈ n¹
    End
End
In case of criterion 4
    Let M denotes the total number of PHICH channels in the subframe
    Let L denotes the number of PHICH groups in the subframe
        T = ⌈M/L⌉(ceiling)
    While there is no valid PHICH group that has T or less than T
    PHICH channels
        T = T + 1
    End
    Let n² denote the group indexes of the groups having less than or
        equal to T PHICH channels
    If there is only one group with min E_sum(n) for all n²
        E_sum(n⁰) = min E_sum(n)    n∈n²
    Else
        E_sum(n¹) = min E_sum(n)    n∈n²
        N(n⁰) = min N(n)    n∈ n¹
    End
End
n⁰ is the selected PHICH group
Determine the corresponding sequence index m⁰
Mark resource (n⁰,m⁰) as unavailable
Mark UE i as processed
E_sum(n⁰) = E_sum(n⁰) + E_i
N(n⁰) = N(n⁰) + 1
If there are still UEs in the list that are not processed
    Take the next unprocessed UE in the list
    else
        End of list is reached
    End
End (while)
```

After $n_{DMRS}$ or $(n^0, m^0)$ are selected for all PHICH channels, the sum of the required TEPRE for all PHICHs is compared to the transmit power allocated to all PHICHs in an OFDM symbol. In an OFDM symbol in which PHICH channels are transmitted, other channels are also transmitted. For example, in FDD with normal PHICH duration, PHICHs are transmitted in the first symbol in a subframe. Downlink (DL) Reference Signal (RS), Physical Control Format Indicator Channel (PCFICH) and Physical Downlink Control Channel (PDCCH) are also transmitted in this symbol. The transmit power allocated to PHICHs in a PHICH symbol can be set statically through configuration, or can be calculated dynamically by subtracting the power used by other channels from the maximum total transmit power per symbol.

As an example, assume that M PHICHs are transmitted in a symbol and the transmit power allocated to the PHICHs is $P_{PHICH}$ (in the unit of watts). Also assume that the required TEPRE for PHICH i is $E_i$. If the sum of the required TEPRE for all PHICHs is greater than the transmit power allocated to all PHICHs in an OFDM symbol, the actual TEPRE (in the unit of watts) assigned to PHICH channel i is calculated as $$E_i^{actual} = \left(E_i \Big/ \sum_{i=1}^{M} E_i\right) \cdot P_{PHICH}. \qquad \text{Eq. 4}$$

Otherwise, the actual TEPRE for PHICH i is given by:

$$E_i^{actual} = E_i \qquad \text{Eq. 5}$$

If the sum of the required TEPRE for all PHICHs is greater than the transmit power allocated to all PHICHs in an OFDM symbol, instead of normalizing TEPRE for all PHICH channels, another option is to drop some PHICHs. That is, some PHICHs will not be transmitted so that the remaining PHICHs can be transmitted at the required TEPRE without exceeding the transmit power allocated to all PHICH channels. When some PHICH channels are not transmitted, the corresponding UL data may or may not be transmitted. Not transmitting the corresponding UL data has the advantage of minimizing inter-cell interference. On the other hand, it may be simpler to not change UL traffic scheduling. In that case, PUSCH transmissions for some mobile terminals 40 are scheduled but the base station 20 would not transmit the corresponding PHICHs. In the absence of a PHICH, the corresponding mobile terminal 40 likely considers this case as receiving a NACK. It will perform HARQ retransmission. The base station should assume a HARQ retransmission will be performed.

In some embodiments of the invention, the scheduler 32 may compare the difference between the total required TEPRE for all PHICHs and the available transmit power. If the difference is less then a threshold, the scheduler 32 may normalize the TEPRE for all PHICHs. On the other hand, where the difference exceeds the threshold, the scheduler 32 may drop (fail to transmit) one or more PHICHs. This option may be preferred when the deficit between the required TEPRE and the available transit power is large. In this case, normalizing TEPRE for all PHICHs may result in a very high error rate. Thus, it may be more advantageous to drop some PHICHs rather than suffer a high error rate on all PHICHs.

When multi-user MIMO for PUSCH (also be referred as virtual MIMO or V-MIMO) is supported, two mobile terminals 40 in a V-MIMO pair may share the same resource blocks. The scenarios where one mobile terminal's resource block allocation overlaps with the resource block allocations of two or more mobile terminals 40 is not considered. For example, if Physical Resource Blocks (PRBs) 11 to 20 are assigned to mobile terminal i, they can be assigned to mobile terminal j as well. However, PRB 11 to 20 can't be divided into two parts and assigned to two more mobile terminals 40 (such as PRB 11 to 18 being assigned to mobile terminal j and PRB 19 and 20 being assigned to mobile terminal k). Not all RBs among PRB 11 to 20 have to be assigned to mobile terminal j, but the remaining RBs can't be assigned to another mobile terminal 40. When two mobile terminals 40 share the same RBs, the cyclic shifts of DM RS of the two PUSCH transmissions have to be far enough apart so that both PUSCH transmissions can be demodulated/decoded successfully.

The cyclic shift of the DM RS for a PUSCH transmission is dependent on a parameter from the field of cyclic shift for DM RS in the uplink (UL) grant message. This parameter is different from $n_{DMRS}$, which is used to determine PHICH resource ($n_{group}$, $m_{seq}$), but does have a one-to-one mapping relationship with $n_{DMRS}$.

There are different rules for selecting DM RS cyclic shifts for a V-MIMO pair from a PUSCH error rate performance perspective. One option is to maximize the difference between the two cyclic shifts (the max difference is π). This option would be best in terms of PUSCH error rate performance, but it also means that once a cyclic shift is assigned to one mobile terminal in the V-MIMO pair, there is only one choice available for the other mobile terminal. The rule can be relaxed to allow the cyclic shift difference to be other values close to π, such as 5 π/6. Of course, the PUSCH error rate performance may be impacted to some extent. As previously noted, a minimum distance between cyclic shifts for mobile terminals 40 in a V-MIMO pair may be required.

Due to the rules of selecting DM RS cyclic shifts for a V-MIMO pair, one mobile terminal's dynamically scheduled initial transmission should not be paired with another mobile terminal's re-transmission for which DCI format 0 UL grant is not required. Also, one mobile terminal's dynamically scheduled initial transmission should not be paired with another mobile terminal's semi-persistently configured transmission for which DCI format 0 UL grant is not required. For a re-transmission for which a DCI format 0 UL grant is not required, or a semi-persistently configured PUSCH transmission, or a PUSCH transmission associated with a random access response grant, $n_{DMRS}$ is fixed for the mobile terminal 40. Due to the rules of selecting DM RS cyclic shifts for a V-MIMO pair, there are likely very few $n_{DMRS}$ values, or possibly only one value, that can be taken by the other mobile terminal 40. Thus, the probability that the corresponding PHICH resources ($n_{group}$, $m_{seq}$) are not available for the V-MIMO pair is not small and can not be ignored. Since there is no easy solution to the problem, it is better to establish some V-MIMO pairing rules to avoid these scenarios.

Even if the above V-MIMO scenarios are excluded, it is still possible that no PHICH resources can be allocated for the V-MIMO pair due to cyclic shift distance requirement between the mobile terminals 40 in the pair. However, the probability of not being able to allocate PHICH resources for the V-MIMO pair is expected to be small after the exclusion of the above described scenarios. The probability of not being able to allocate PHICH resources for the V-MIMO pair can be reduced further by giving V-MIMO pairs higher priority than other mobile terminals in the resource allocation.

When no PHICH resources are available for a V-MIMO pair due to a resource contention, the scheduler 32 may attempt to redo or revise scheduling to avoid PHICH resource conflicts. This solution may not be practical due to the tight time budget for scheduler. Alternatively, the scheduler 32 may deliberately skip the PHICH transmission for a mobile terminal 40 that causes a PHICH resource contention. In this case, the skipped mobile terminal 40 is likely to detect PHICH erasure and to perform PUSCH re-transmissions accordingly. Finally, the scheduler 32 could take no corrective action. In this case, the V-MIMO pair may perform unnecessary re-transmissions or stop transmission when the maximum number of HARQ retransmission is reached; however, this error can be recovered by higher layer. The probability for a resource contention can be monitored and used to decide whether the number of PHICH groups should be adjusted.

To support V-MIMO, the process described above for PHICH resource allocation may need to be modified. One option is to apply the four criterions mentioned before to the V-MIMO pair jointly. This option makes the process much more complicated. A simplified process is to apply these criterions to the V-MIMO pair separately, which is described in the following code list.

Code list 2 - Resource allocation for V-MIMO

```
Input: a list of the scheduled mobile terminals (UEs), and the lowest PRB index of the RBs
assigned in the first slot to each mobile terminal.
Define
E_sum(n): required transmit energy per resource element per group for PHICH group n
N(n): number of PHICH channels in PHICH group n.
E_i: the required transmit energy per RE for PHICH channel i (or for UE i).
Initialize E_sum(n) and N(n) to zero for all PHICH groups in the subframe.
For all UEs in the list whose corresponding PUSCH transmissions (including HARQ
retransmissions) do not need a DCI format 0 UL grant
    Get the lowest PRB index, I_PRB^Index for the UE (UE i)
    Determine n_DMRS based on the latest UL grant (or it is zero for a semi-persistently
        configured PUSCH transmission or a PUSCH transmission associated with
        a random access response grant)
    Calculate the corresponding resource (n , m) from n_DMRS and I_PRB^Index .
    Mark the resource (n , m) as unavailable
    Mark UE i as processed
    E_sum(n) = E_sum(n) + E_i
    N(n) = N(n) + 1
End
Take the next unprocessed UE in the list (UEs are in V-MIMO pairs are considered first)
While the end of the list is not reached
    Get the lowest PRB index, I_PRB^Index for the UE (UE i)
    For n_DMRS^i = 0 to 7
        Calculate the corresponding resource (n_group^i,m_seq^i)
        If the resource (n_group^i,m_seq^i) is valid and available
            If UE i and UE j are V-MIMO pair
                Given n_DMRS^i corresponding n_group^i for UE i , determine the
                    n_DMRS^j for UE j based on certain V-MIMO cyclic shift selection
                    rule
                For all selected n_DMRS^j for UE j
                    Calculate the corresponding resource (n_group^j,m_seq^j)
                    If (n_group^j,m_seq^j) is available
                        Set resource valid flag if it is not set yet
                        Exit the For loop
                    End
                End
                If the resource valid flag is set
                    n_group^i is valid
                End
            Else
                n_group^i is valid
            End
        End
    End
In case of criterion 1
    n^i—0 is the first valid n_group^i for UE i
```

| Code list 2 - Resource allocation for V-MIMO |
| --- |

```
        If UE i and UE j are V-MIMO pair
            Given n_DMRS^i corresponding to n^{i—0} for UE i , determine the n_DMRS^j for
                UE j based on V-MIMO cyclic shift selection rule
            For each selected n_DMRS^j
                Calculate the corresponding resource (n_group^j, m_seq^j)
                If (n_group^j, m_seq^j) is available
                    n_group^j is valid for UE j
                End
            End
            n^{j—0} is the first valid n_group^j for UE j
        End
    End Case
    In case of criterion 2
        If there is one group with min N(n) for all valid n_group^i
            N(n^{i—0}) = min N(n)    n∈all valid n_group^i
        Else
            N(n^{i—1}) = min N(n)    n∈ all valid n_group^i
            E_sum(n^{i—0}) = min E_sum(n)    n∈ n^{i—1}
        End
        If UE i and UE j are V-MIMO pair
            Given n_DMRS^i corresponding to n^{i—0} for UE i , determine the n_DMRS^j for
                UE j based on V-MIMO cyclic shift selection rule
            For each selected n_DMRS^j
                Calculate the corresponding resource (n_group^j, m_seq^j)
                If (n_group^j, m_seq^j) is available
                    n_group^j is valid for UE j
                End
            End
            If there is one group with min N(n) for all valid n_group^j
                N(n^{j—0}) = min N(n)    n∈all _valid _n_group^j
            Else
                N(n^{j—1}) = min N(n)    n∈all _valid _n_group^j
                E_sum(n^{j—0}) = min E_sum(n)    n∈n^{j—1}
            End
        End
    End Case
    In case of criterion 3
        If there is one group with min E_sum(n) for all valid n_group^j
            E_sum(n^{i—0}) = min E_sum(n)    n∈ all valid n_group^j
        Else
            E_sum(n^{i—1}) = min E_sum(n)    n∈ all valid n_group^j
            N(n^{i—0}) = min N(n)    n∈ n^{i—1}
        End
        If UE i and UE j are V-MIMO pair
            Given n_DMRS^i corresponding to n^{i—0} for UE i , determine the n_DMRS^j for
                UE j based on V-MIMO cyclic shift selection rule
            For each selected n_DMRS^j
                Calculate the corresponding resource (n_group^j, m_seq^j)
                If (n_group^j, m_seq^j) is available
                    n_group^j is valid for UE j
                End
            End
            If there is one group with min N(n) all valid n_group^j
                E_sum(n^{j—0}) = min E_sum(n)    n∈ all valid n_group^j
            Else
                E_sum(n^{j—1}) = min E_sum(n)    n∈ all valid n_group^j
                N(n^{j—0}) = min N(n)    n∈ n^{j—1}
            End
        End
    End Case
    In case of criterion 4
        Let M denotes the number of PHICH channels in the subframe
        Let L denotes the number of PHICH groups in the subframe
        T = ⌈M / L⌉(ceiling)
        While there is no valid PHICH group for UE i that has T or less than T PHICH
            channels
            T = T + 1
        End
        Let n^{i—2} denotes the group having less than or equal to T
            PHICH channels
        If there is one group with min E_sum(n) for all n^{i—2}
            E_sum(n^{i—0}) = min E_sum(n)    n∈ n^{i—2}
        Else
            E_sum(n^{i—1}) = min E_sum(n)    n∈ n^{i—2}
            N(n^{i—0}) = min N(n)    n∈ n^{i—1}
        End
        If UE i and UE j are V-MIMO pair
```

-continued

Code list 2 - Resource allocation for V-MIMO

```
      Given n_DMRS^i corresponding to n^{i—0} for UE i , determine the n_DMRS^j for
         UE j based on V-MIMO cyclic shift selection rule
      For each selected n_DMRS^j
         Calculate the corresponding resource (n_group^j, m_seq^j)
         If (n_group^j, m_seq^j) is available
            n_group^j is valid for UE j
         End
      End
      While there is no valid PHICH group for UE j that has T or less than
         T PHICH channels
         T = T + 1
      End
      Let n^{j—2} denotes the group indexes of the groups meeting the above
         condition
      If there is one group with min E_sum(n) for all n^{j—2}
         E_sum(n^{j—0}) = min E_sum(n) n∈ n^{j—2}
      Else
         E_sum(n^{j—1}) = min E_sum(n) n∈ n^{j—2}
         N(n^{j—0}) = min N(n) n∈ n^{j—1}
      End
   End
End Case
n^{i—0} is the selected PHICH group for UE i
Determine the corresponding sequence index m^{i—0}
Mark resource (n^{i—0}, m^{i—0}) as unavailable
Mark UE i as processed
E_sum(n^{i—0}) = E_sum(n^{i—0}) + E_i
N(n^{i—0}) = N(n^{i—0}) + 1
If UE i and UE j are V-MIMO pair
   n^{j—0} is the selected PHICH group for UE j
   Determine the corresponding sequence index m^{j—0}
   Mark resource (n^{j—0}, m^{j—0}) as unavailable
   Mark UE j as processed
   E_sum(n^{j—0}) = E_sum(n^{j—0}) + E_j
   N(n^{j—0}) = N(n^{j—0}) + 1
      End
   If there are still UEs in the list that are not processed
      Take the next unprocessed UE in the list
   else
      End of list reached
   End
End (while)
```

The energy normalization (or dropping some PHICHs) is not changed for V-MIMO.

Figure 5:
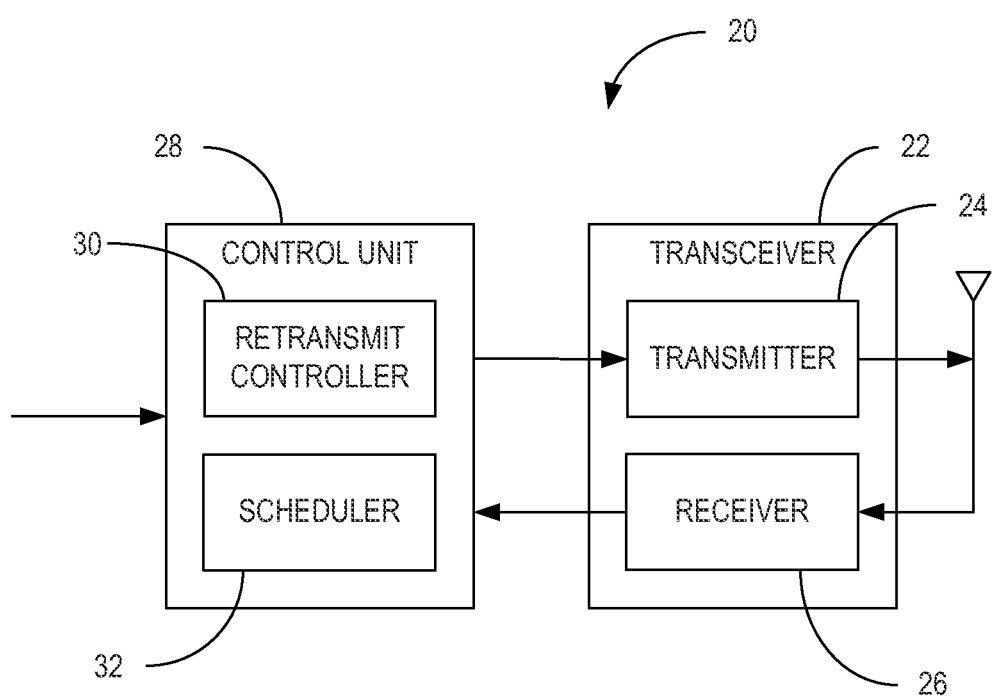
FIG. 5 illustrates an exemplary base station for implementing the resource allocation methods described herein.

FIG. 5 illustrates an exemplary base station 20 implementing the resource allocation methods herein described. The base station 20 generally comprises a transceiver 22 and a control unit 28. The transceiver may comprise, for example, a cellular radio transceiver including a transmitter 24 and receiver 26 that operate according to the LTE standard, or other standard now known or later developed. The control unit 28 controls the operation of the transceiver 22. The control unit includes a retransmit controller 30 and a scheduler 32. The main purpose of the retransmit controller 30 is to acknowledge uplink transmissions from the mobile terminals 40 on the PUSCH as previously described. The scheduler, as previously described, schedules the uplink transmissions and allocates resources for the PHICH as herein described.

The resource allocation method described above improves PHICH error rate performance in general. Normally, the required TEPRE varies from one PHICH group to another. Fixing TEPRE for all groups can result in too much power for some PHICH groups and too little power for other groups. The transmit EPRE is not fixed for all groups in some embodiments and the TEPRE is allowed to take any value. The sum of the required TEPRE per group for all PHICH groups (or equivalently the sum of the TEPRE for all mobile terminals) is compared to the transmit power allocated to all PHICH channels in an OFDM symbol to decide if power normalization is needed. If the sum of the required TEPRE per group for all PHICH groups is not greater than the transmit power allocated to all PHICH channels in an OFDM symbol, any PHICH channel can be transmitted at the required TEPRE. Effectively, PHICH groups requiring less power can give the extra power headroom to PHICH groups requiring more power. Consequently, PHICH error rate performance will be improved for PHICH groups requiring more transmit power. For PHICH groups that require less TEPRE, they don't transmit at the fixed, higher TEPRE. Thus, inter-cell interference is reduced.

Another advantage of this embodiment is the reduced processing by removing the need to sort the PHICHs in order based on required TEPRE. When the TEPRE for a group is not fixed, the sorting of PHICHs before PHICH resource assignment becomes far less important. However, if there is enough processing power, the sorting can be performed to improve inter-cell interference. With sorting, the probability of having very high TEPRE for a group is minimized. The high peaks of TEPRE for some PHICH groups can strongly interfere RS or PDCCH of the neighbor cells at some RE locations. The sorting can help smooth the TEPRE and thus smooth the inter-cell interference.

Finally, the resource allocation methods described herein can be applied to both FDD and TDD, with normal or extended cyclic prefix.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method implemented by a base station of assigning resources on a downlink control channel to a group of acknowledgement channels for sending acknowledgement signals to a group of scheduled mobile terminals transmitting on an uplink traffic channel, said method comprising:
   determining, by a scheduler of the base station, for each acknowledgement channel, a required transmit energy based on the channel conditions experienced by a corresponding mobile terminal assigned to the acknowledgement channel;
   assigning, by the scheduler, each acknowledgement channel to a channel group having at least one of a minimum number of channels and a minimum cumulative transmit energy, wherein:
      acknowledgement channels in the same channel group share the same downlink resources;
      each channel group comprises the same number of resource elements; and
      a transmit power per resource element varies for channels in different channel groups and for at least two channels in the same channel group, wherein a resource element is a resource defined by one subcarrier over one symbol period;
   normalizing, by the scheduler, a total required transmit energy for all acknowledgement channels to a predetermined value when the total required transmit energy for all acknowledgement channels in all channel groups exceeds an available transmit power for the acknowledgement channels; and
   sending, by a retransmission controller of the base station, acknowledgment signals to the mobile terminals over the acknowledgement channels.

2. The method of claim 1 wherein assigning each acknowledgement channel to a channel group comprises:
   determining, based on the uplink resources assigned to the corresponding mobile terminal, a set of available channel groups for the acknowledgement channel; and
   assigning the acknowledgement channel to a first available channel group in said set determined by its group number.

3. The method of claim 1 wherein assigning each acknowledgement channel to a channel group comprises:
   determining, based on the uplink resources assigned to the corresponding mobile terminal, a set of available channel groups for the acknowledgement channel; and
   assigning the acknowledgement channel to an available channel group in said set with a minimum number of acknowledgement channels.

4. The method of claim 1 wherein assigning each acknowledgement channel to a group comprises:
   determining, based on the uplink resources assigned to the corresponding mobile terminal, a set of available channel groups for the acknowledgement channel; and
   assigning the acknowledgement channel to an available group in said set with a minimum cumulative transmit energy.

5. The method of claim 1 wherein assigning each acknowledgement channel to a group comprises:
   determining, based on the uplink resources assigned to the corresponding mobile terminal, a set of available channel groups for the acknowledgement channel having a number of acknowledgement channels not exceeding a threshold; and
   assigning the acknowledgement channel to an available channel group in said set with a minimum cumulative transmit energy.

6. The method of claim 1 for a multiple-input, multiple output (MIMO) system further comprising jointly assigning the acknowledgement channels for a mobile terminal pair to respective channel groups.

7. The method of claim 6 wherein jointly assigning the acknowledgement channels for a mobile terminal pair to respective channel groups comprises:
   determining a set of available channel group pairs based on uplink resources assigned to the mobile terminal pair; and
   assigning the acknowledgement channels to an available channel group pair in said set.

8. The method of claim 7 wherein determining one or more available channel group pairs comprises finding a pair of available channel groups having unassigned spreading sequences that can be assigned to respective ones of the acknowledgement channels so that the cyclic shifts of the demodulation reference signals for the corresponding PUSCH transmissions are separated by a predetermined minimum distance.

9. The method of claim 8 wherein assigning the acknowledgement channels to an available channel group pair in said set comprises:
   determining, based on the uplink resources assigned to the corresponding mobile terminal pair, a set of available channel group pairs for the corresponding pair of acknowledgement channels; and
   assigning the acknowledgement channels to the first available channel group pair in said set determined by group numbers of the channel groups in said channel group pair.

10. The method of claim 8 wherein assigning the acknowledgement channels to an available channel group pair in said set comprises:
    determining, based on the uplink resources assigned to the corresponding mobile terminal pair, a set of available channel group pairs for the corresponding pair of acknowledgement channels; and
    assigning the acknowledgement channels to an available channel group pair in said set with a minimum number of acknowledgement channels.

11. The method of claim 8 wherein assigning the acknowledgement channels to an available channel group pair in said set comprises:
    determining, based on the uplink resources assigned to the corresponding mobile terminal pair, a set of available channel group pairs for the corresponding pair of acknowledgement channels; and
    assigning the acknowledgement channels to an available channel group pair in said set with a minimum cumulative transmit energy.

12. The method of claim 8 wherein assigning the acknowledgement channels to an available channel group pair in said set comprises:
    determining, based on the uplink resources assigned to the corresponding mobile terminal pair, a set of available channel group pairs for the corresponding pair of acknowledgement channels having a number of acknowledgement channel not exceeding a threshold; and assigning the acknowledgement channels to an available channel group pair in said set with a minimum cumulative transmit energy.

13. The method of claim 6 further comprising jointly assigning spreading sequences to the acknowledgement channels for the mobile terminal pair.

14. The method of claim 13 wherein jointly assigning spreading sequences to the acknowledgement channels for the mobile terminal pair comprises assigning spreading sequences from respective channel groups in the channel group pair so that the cyclic shifts of demodulation reference signals for the corresponding PUSCH transmissions are separated by a predetermined minimum distance.

15. The method of claim 1 wherein normalizing the total required transmit energy for all channels to a predetermined value when the total required transmit energy for all acknowledgement channels in all channel groups exceeds an available transmit power comprises
normalizing the cumulative transmit energy when the total required transmit energy for all acknowledgement channels exceeds the total available power by less than or equal to a predetermined amount; and
dropping one or more acknowledgement channels when the total required transmit energy for all acknowledgement channels exceeds the total available power by more than the predetermined amount.

16. The method of claim 1 wherein determining, for each acknowledgement channel, a required transmit energy based on the channel conditions comprises:
determining a reference signal transmit energy;
estimating a signal quality of the acknowledgement channel;
determining a target signal quality to meet a predetermined error performance requirement; and
computing the required transmit energy for the acknowledgement channel from the reference signal transmit energy, estimated signal quality of the acknowledgement channel; and target signal quality.

17. The method of claim 1 wherein determining, for each acknowledgement channel, a required transmit energy based on the channel conditions comprises:
estimating a channel gain metric for a reference signal;
computing the required transmit energy from a predetermined fixed transmit energy and the channel gain metric.

18. The method of claim 1 wherein determining, for each acknowledgement channel, a required transmit energy based on the channel conditions comprises:
determining a control channel transmit energy;
determining an offset as a function of a coding rate, number of channel elements for the control channel, or both; and
computing the required transmit energy from the control channel transmit energy and the offset.

19. A base station comprising:
a transceiver for communicating with a group of mobile terminals;
a control unit connected to the transceiver, said control unit comprising:
a retransmission controller to send acknowledgment signals to said mobile terminals over respective acknowledgement channels to acknowledge uplink transmissions from said of mobile terminals, and
a scheduler to schedule the uplink transmission from said mobile terminals and to assign resources on a downlink control channel to said acknowledgment channels;
wherein said scheduler is configured to:
determine, for each acknowledgment channel, a required transmit energy based on the channel conditions experienced by the mobile terminal;
assign each acknowledgment channel to a channel group having at least one of a minimum number of channels and a minimum cumulative transmit energy, wherein:
acknowledgement channels in the same channel group share the same downlink resources;
each channel group comprises the same number of resource elements; and
a transmit power per resource element varies for channels in different channel groups and for at least two channels in one of the channel groups, wherein a resource element is a resource defined by one subcarrier over one symbol period; and
normalize the required transmit energy for all channels to a predetermined value when the total transmit energy for all acknowledgment channels in all channel groups exceeds an available transmit power.

20. The base station of claim 19 wherein the scheduler assigns each mobile terminal to a channel group by:
determining, based on the uplink resources assigned to the corresponding mobile terminal, a set of available channel groups for the acknowledgement channel; and
assigning the acknowledgement channel to a first available channel group in said set determined by its group number.

21. The base station of claim 19 wherein the scheduler assigns each acknowledgement channel to a group by:
determining, based on the uplink resources assigned to the corresponding mobile terminal, a set of available channel groups for the acknowledgement channel; and
assigning the acknowledgement channel to an available channel group in said set with a minimum number of acknowledgement channels.

22. The base station of claim 19 wherein the scheduler assigns each acknowledgement channel to a group by:
determining, based on the uplink resources assigned to the corresponding mobile terminal, a set of available channel groups for the acknowledgement channel; and
assigning the acknowledgement channel to an available group in said set with a minimum cumulative transmit energy.

23. The base station of claim 19 wherein the scheduler assigns each acknowledgement channel to a group by:
determining, based on the uplink resources assigned to the corresponding mobile terminal, a set of available channel groups for the acknowledgement channel having a number of acknowledgement channels not exceeding a threshold; and
assigning the acknowledgement channel to an available channel group in said set with a minimum cumulative transmit energy.

24. The base station of claim 19 for a multiple-input, multiple output (MIMO) system wherein the scheduler is configured to jointly assign the acknowledgement channels for a mobile terminal pair to respective channel groups.

25. The base station of claim 19 wherein the scheduler jointly assigns the acknowledgement channels for a mobile terminal pair to respective channel groups by:
determining a set of available channel group pairs based on uplink resources assigned to the mobile terminal pair; and assigning the acknowledgement channels to an available channel group pair in said set.

26. The base station of claim 25 wherein the scheduler determines one or more available channel group pairs by finding a pair of available channel groups having unassigned spreading sequences that can be assigned to respective ones of the acknowledgement channels so that the cyclic shifts of demodulation reference signals for corresponding PUSCH transmissions are separated by a predetermined minimum distance.

27. The base station of claim 26 wherein the scheduler assigns the acknowledgement channels to an available channel group pair in said set by:
   determining, based on the uplink resources assigned to the corresponding mobile terminal pair, a set of available channel group pairs for the corresponding pair of acknowledgement channels; and
   assigning the acknowledgement channels to the first available channel group pair in said set determined by group numbers of the channel groups in said channel group pair.

28. The base station of claim 26 wherein the scheduler assigns the acknowledgement channels to an available channel group pair in said set by:
   determining, based on the uplink resources assigned to the corresponding mobile terminal pair, a set of available channel group pairs for the corresponding pair of acknowledgement channels; and
   assigning the acknowledgement channels to an available channel group pair in said set with a minimum number of acknowledgement channels.

29. The base station of claim 26 wherein the scheduler assigns the acknowledgement channels to an available channel group pair in said set by:
   determining, based on the uplink resources assigned to the corresponding mobile terminal pair, a set of available channel group pairs for the corresponding pair of acknowledgement channels; and
   assigning the acknowledgement channels to an available channel group pair in said set with a minimum cumulative transmit energy.

30. The base station of claim 26 wherein the scheduler assigns the acknowledgement channels to an available channel group pair in said set by:
   determining, based on the uplink resources assigned to the corresponding mobile terminal pair, a set of available channel group pairs for the corresponding pair of acknowledgement channels having a number of acknowledgement channel not exceeding a threshold; and
   assigning the acknowledgement channels to an available channel group pair in said set with a minimum cumulative transmit energy.

31. The base station of claim 24 wherein the scheduler is further configured to jointly assign spreading sequences to the acknowledgement channels for the mobile terminal pair.

32. The base station of claim 31 wherein the scheduler jointly assigns spreading sequences to the acknowledgement channels for the mobile terminal pair by assigning spreading sequences from respective channel groups in the channel group pair so that the cyclic shifts of demodulation reference signals for corresponding PUSCH transmissions are separated by a predetermined minimum distance.

33. The base station of claim 19 wherein the scheduler is further configured to:
   normalize the total required transmit energy when the total required transmit energy for all acknowledgement channels exceeds the total available power by less than or equal to a predetermined amount; and
   drop one or more acknowledgement channels when the total required transmit energy for all acknowledgement channels exceeds the total available power by more than the predetermined amount.

34. The base station of claim 19 wherein the scheduler determines a required transmit energy for each acknowledgement channel by:
   determining a reference signal transmit energy;
   estimating a signal quality of the acknowledgement channel;
   determining a target signal quality to meet a predetermined error performance requirement; and
   computing the required transmit energy for the acknowledgement channel from the reference signal transmit energy, estimated signal quality of the acknowledgement channel; and target signal quality.

35. The base station of claim 19 wherein the scheduler determines a required transmit energy for each acknowledgement channel by:
   estimating a channel gain metric for a reference signal;
   computing the required transmit energy from a predetermined fixed transmit energy and the channel gain metric.

36. The base station of claim 19 wherein the scheduler determines a required transmit energy for each acknowledgement channel by:
   determining a control channel transmit energy;
   determining an offset as a function of a coding rate, number of control channel elements for the control channel, or both; and
   computing the required transmit energy from the control channel transmit energy and the offset.

\* \* \* \* \*